United States Patent
Murrish et al.

(10) Patent No.: US 10,160,455 B2
(45) Date of Patent: Dec. 25, 2018

(54) COMBINED SENSORS FOR MAKING RECOMMENDATIONS TO A DRIVER

(71) Applicant: HONDA MOTOR CO., LTD., Minato-ki, Tokyo (JP)

(72) Inventors: Robert Wesley Murrish, Santa Clara, CA (US); Daniel Essindi Behrendt, Atherton, CA (US); Rahul Khanna, Plantation, FL (US); Dennis Patrick Clark, Menlo Park, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/666,270

(22) Filed: Aug. 1, 2017

(65) Prior Publication Data

US 2017/0341657 A1    Nov. 30, 2017

Related U.S. Application Data

(63) Continuation of application No. 14/876,255, filed on Oct. 6, 2015, now Pat. No. 9,815,474.

(51) Int. Cl.
| | |
|---|---|
| *G01C 21/00* | (2006.01) |
| *B60W 40/06* | (2012.01) |
| *B60W 50/14* | (2012.01) |

(52) U.S. Cl.
CPC ............ *B60W 40/06* (2013.01); *B60W 50/14* (2013.01); *B60W 2300/36* (2013.01); *B60W 2422/10* (2013.01); *B60W 2422/70* (2013.01); *B60W 2422/95* (2013.01); *B60W 2550/147* (2013.01); *B60Y 2200/12* (2013.01)

(58) Field of Classification Search
CPC ............ B60W 40/06; B60W 2422/10; B60W 2422/70; B60W 2550/147
See application file for complete search history.

(56) References Cited

U.S. PATENT DOCUMENTS

| | | | | |
|---|---|---|---|---|
| 5,006,072 | A * | 4/1991 | Letovsky | G09B 9/058 348/121 |
| 5,537,092 | A * | 7/1996 | Suzuki | A42B 3/042 340/432 |
| 6,859,327 | B2 * | 2/2005 | Del Bianco | G02B 27/0176 345/8 |
| 6,934,633 | B1 * | 8/2005 | Gallagher | G01C 21/00 342/357.52 |
| 8,810,482 | B2 * | 8/2014 | Abdollahi | G02B 27/0176 345/7 |

(Continued)

FOREIGN PATENT DOCUMENTS

CN    202907883 U    5/2013

*Primary Examiner* — Ian Jen
(74) *Attorney, Agent, or Firm* — Arent Fox LLP

(57) ABSTRACT

A system that identifies road conditions associated with a road surface is provided. The system includes a first sensor recording a first motion amount related to a head of a rider and at least a second sensor recording at least a second motion amount of a portion of a vehicle. The system also includes a comparison manager determining a severity level based on a comparison between the first motion amount and the second motion amount. Also included is a notification manager providing recommendations to the rider based on the severity level. Additionally, an implementation manager may dynamically implement one or more actions based on the severity level.

18 Claims, 9 Drawing Sheets

(56) References Cited

U.S. PATENT DOCUMENTS

| | | | |
|---|---|---|---|
| 8,922,590 B1* | 12/2014 | Luckett, Jr. | G09G 5/377 345/633 |
| 9,001,005 B2* | 4/2015 | Abdollahi | G02B 27/0176 345/7 |
| 9,247,779 B1* | 2/2016 | Aloumanis | G08G 1/137 |
| 9,445,639 B1* | 9/2016 | Aloumanis | A42B 3/0453 |
| 9,451,802 B2* | 9/2016 | Shearman | A42B 3/0426 |
| 2006/0277666 A1* | 12/2006 | Gertsch | A42B 3/04 2/424 |
| 2008/0239080 A1* | 10/2008 | Moscato | A42B 3/0426 348/148 |
| 2009/0016418 A1* | 1/2009 | Silver | H04B 1/385 375/220 |
| 2009/0040296 A1* | 2/2009 | Moscato | G02B 27/0172 348/53 |
| 2009/0109292 A1* | 4/2009 | Ennis | A42B 3/042 348/158 |
| 2010/0102970 A1* | 4/2010 | Hertz | A42B 3/046 340/573.1 |
| 2013/0031699 A1* | 2/2013 | Gafforio | A42B 3/226 2/411 |
| 2013/0093585 A1* | 4/2013 | Ambani | A42B 3/0413 340/475 |
| 2013/0305437 A1* | 11/2013 | Weller | A42B 3/0406 2/422 |
| 2014/0167986 A1* | 6/2014 | Parada | G01C 21/365 340/905 |
| 2014/0273863 A1* | 9/2014 | Luizzi | H04M 1/05 455/66.1 |
| 2015/0323798 A1* | 11/2015 | Huang | G09G 5/10 345/690 |
| 2016/0073722 A1* | 3/2016 | Eustace | A42B 3/0466 340/539.13 |
| 2016/0250983 A1* | 9/2016 | Miller | B60R 16/0236 340/439 |
| 2017/0067750 A1* | 3/2017 | Day | G01C 21/3461 |
| 2017/0129160 A1* | 5/2017 | McRoskey | B29C 53/063 |

* cited by examiner

COMBINED SENSORS FOR MAKING RECOMMENDATIONS TO A DRIVER

CROSS REFERENCE TO RELATED APPLICATION

This application is a continuation application of U.S. patent application Ser. No. 14/876,255 filed Oct. 6, 2015 the disclosure of which is hereby incorporated by reference in its entirety.

BACKGROUND

Motorcycle riders and drivers of other forms of transportation may encounter a variety of detrimental road conditions that may be potentially hazardous. These road conditions may include potholes, objects in the road, uneven road surfaces, and so on. Awareness of road conditions arises by direct observation of the road condition or based on traffic reports. From a rider perspective, direct observation or traffic reports may provide inadequate notice of the detrimental road conditions.

BRIEF DESCRIPTION

This brief description is provided to introduce a selection of concepts in a simplified form as compared to that described below in the detailed description. This brief description is not intended to be an extensive overview of the claimed subject matter, identify key factors or essential features of the claimed subject matter, nor is it intended to be used to limit the scope of the claimed subject matter.

An implementation of this disclosure relates to a system that identifies road conditions associated with a road surface. The system may include a first sensor recording a first motion amount related to a head of a rider and a second sensor recording a second motion amount of a portion of a vehicle. The system may also include a comparison manager determining a severity level based on a comparison between the first motion amount and the second motion amount. Further, the system may include a notification manager providing recommendations to the rider based on the severity level.

Another implementation of this disclosure relates to a method for identifying road conditions associated with a road surface. The method may include obtaining, by a system comprising a processor, a set of measurements. Respective measurements of the set of measurements may be determined at different levels of a vehicle suspension. The method may also include comparing, by the system, respective measurements of the set of measurements. Further, the method may include determining, by the system, at least one action based on a determination that a difference between at least two measurements of the respective measurements is above a threshold amount. The method may also include outputting, by the system, a recommendation that includes an implementation of the at least one action.

Yet another implementation of this disclosure relates to a system for implementing an action based on road conditions associated with a road surface. The system may include a first sensor recording a first motion amount at a first portion of a vehicle located below a suspension level, a second sensor recording a second motion amount at a second portion of a vehicle located above a suspension level, and a third sensor recording a third motion amount at a helmet. The system may also include a comparison manager determining a severity level based on a comparison between the first motion amount, the second motion amount, and the third motion amount. Further, the system may include a notification manager providing recommendations to the rider based on a determination that the severity level is above a threshold amount.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings in which.

DETAILED DESCRIPTION

Figure 1:
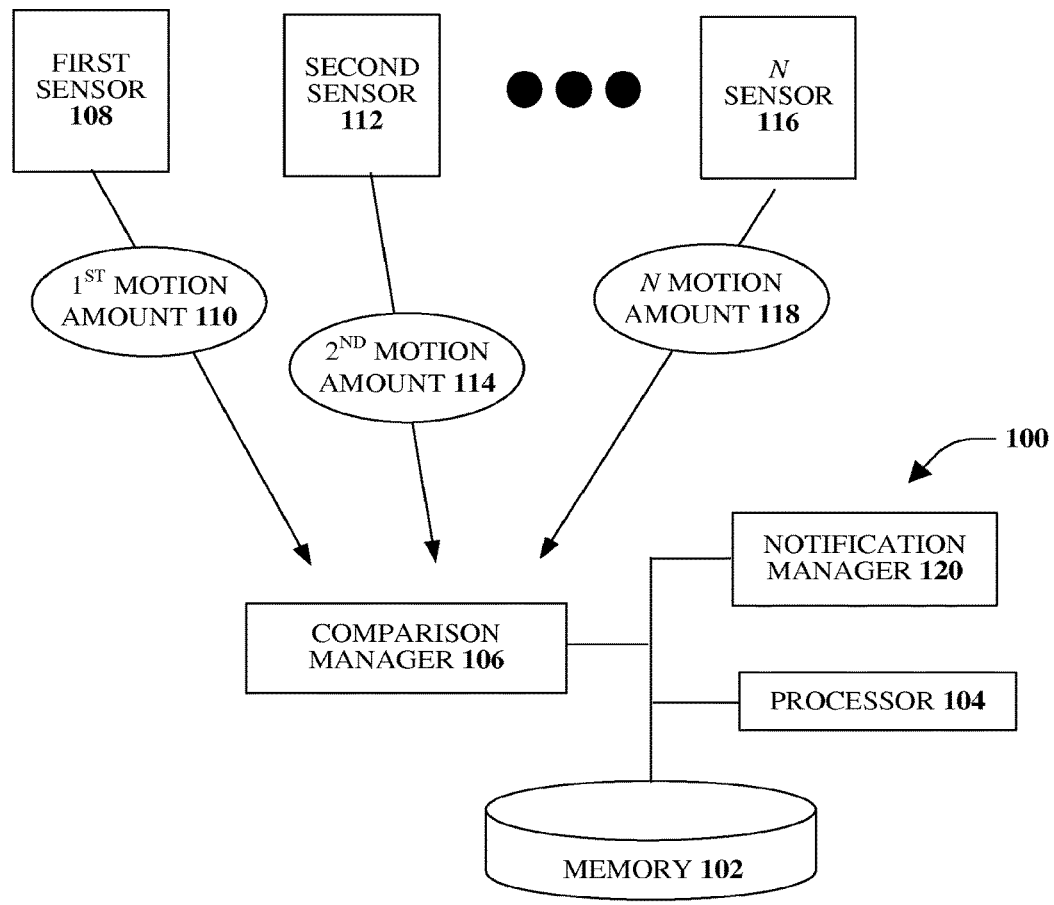
FIG. 1 illustrates an example non-limiting system for identifying road conditions associated with a road surface according to an aspect of this disclosure.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

FIG. 1 illustrates an example non-limiting system 100 for identifying road conditions associated with a road surface according to an aspect of this disclosure. Motorcycle riders (and bicycle riders) may be more sensitive to road conditions as compared to operators of other modes of transportation (e.g., cars, trucks, vans, and so on). Some motorcycles may utilize a single sensor to determine an impact to a rider. Single sensors, however, may not be accurate because the placement of the sensor may not illustrate the full gravity of the road condition that the motorcycle rider may be experiencing. For example, the motorcycle might detect a bump; however, a sensor on the motorcycle may not be accurate with determining the forces being asserted onto the motorcycle rider.

Therefore, a pothole/bump detection as discussed herein may be utilized to quantify the effect on the riders. Sensors, such as Inertial Measurement Units (IMUs), at different levels in the suspension may be utilized to determine additional information related to the disturbance than may be determined from a single senor located on the frame of the vehicle. According to an implementation, movement of a head and/or helmet may be measured. Also measured may be the movement of a frame and/or a wheel of the vehicle. This information may be used to determine acceleration and/or force measurements and to make recommendations to the rider (e.g., avoid a road, use caution, change speed, and so on). In accordance with an implementation, one or more actions may be dynamically implemented based on the determined recommendation.

Although the various aspects are discussed with respect to a motorcycle and a motorcycle rider, the aspects are not limited to this implementation. Instead, the various aspects may be utilized by drivers and/or passengers of other modes of transportation including, but not limited to, vehicles (e.g., automobile, truck), bicycles, skateboards, pedestrians, joggers, and so on.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or as instructions separate from the memory 102 (e.g., operatively connected to the memory 102), the various aspects are not limited to this implementation. Instead, in accordance with various implementations, the one or more computer executable components and/or the one or more computer executable instructions may be stored in (or integrated within) the memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 100 may also include a comparison manager 106 that determines a severity level experienced by a motorcycle rider. The comparison manager 106 may receive respective measurements from a set of sensors located at different portions (e.g., different locations) of the motorcycle and/or the motorcycle rider. For example, a first sensor 108 may record a first motion amount 110 and a second sensor 112 may record a second motion amount 114. There may be additional sensors, illustrated as an N sensor 116, where N is an integer, that record respective motion amounts, labeled as N motion amounts 118. Thus, a third sensor records a third motion amount, a fourth sensor records a fourth motion amount and so on.

In addition, although each sensor is illustrated and described as capturing a single motion amount, the various aspects are not limited to this implementation. Instead, one or more of the sensors may capture two or more motion amounts. For example, a sensor may capture a velocity, an orientation, one or more gravitational forces, or combinations thereof.

Each of the motion amounts 110, 112, and/or 116, may be received by the comparison manager 106 based on various considerations. For example, the motion amounts may be received continuously, periodically, at random intervals, or based on a predefined criteria (e.g., if the received motion amount is more than a certain percentage, and so on). For example, a motion amount may at a level that is determined to be on a substantially smooth surface. When a slight bump (or depression) is encountered, the change to the motion amount may be below a threshold level (e.g., below 2%, below 5%, 21%, and so forth). In this case, there may be no action taken. However, if the change to the motion amount is above (or equal to) the threshold level, it might trigger various events as discussed herein. The predefined criteria may be based on preferences of the vehicle operator, based on characteristics of the vehicle, and so on.

Further, the sensors may be located at different areas on or around the motorcycle (or other vehicle). For example, one or more sensor may be located on the motorcycle rider, such as on the rider's head, helmet, arm, or other location. Further, one or more sensors may be located at different locations on the motorcycle. For example, one or more sensors may be located on the motorcycle body and above a suspension level. Further, one or more sensors may be located on the motorcycle below the suspension level (e.g., on a wheel or hub). In such a manner, different locations of motion are monitored and relative movement detected.

A notification manager 120 may provide a recommendation to the rider based on the severity level. The recommendation may be to avoid a road, use caution, change speed, and so on. According to some implementations, the notification manager 120 facilitates the automatic implementation of one or more actions, as will be discussed in further detail below.

Figure 2:
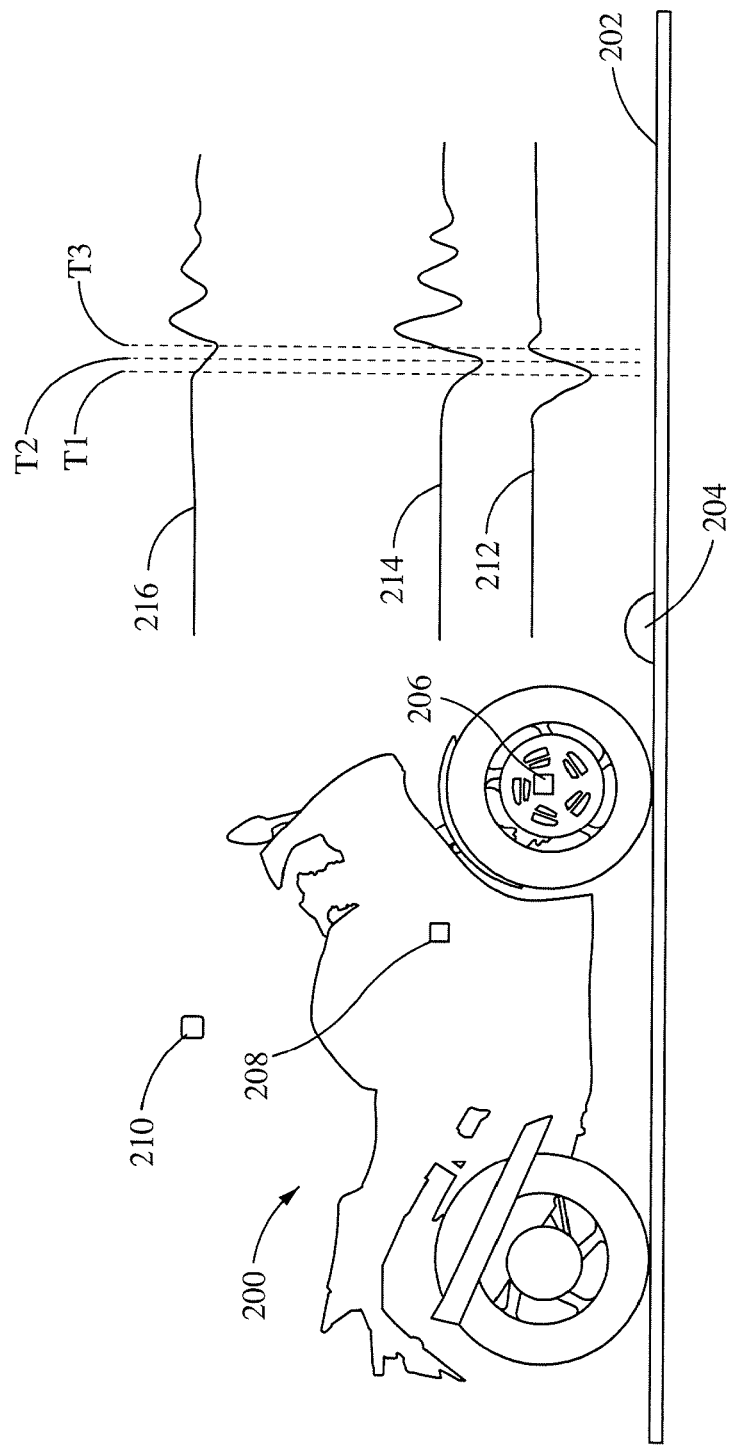
FIG. 2 illustrates a representation of motion detection of a motorcycle according to an aspect of this disclosure.

FIG. 2 illustrates a representation of motion detection of a motorcycle 200 according to an aspect of this disclosure. As illustrated, the motorcycle 200 may be taken over a road surface 202 and may encounter a road hazard, illustrated as a bump 204, although other types of road hazards may be encountered. A first sensor 206 (e.g., the first sensor 110 of FIG. 1) may be located on a wheel or hub (below suspension). A second sensor 208 (e.g., the second sensor 114 of FIG. 1) may be located on the motorcycle body (above suspension). A third sensor 210 (e.g., one of the N sensors 116 of FIG. 1) may be located on the rider (not shown) or on the rider's helmet.

The sensors as discussed herein may be various types of sensors. For example, the sensor may comprise a G sensor capable of determining acceleration. In another example, the sensor may be an inertial measurement unit. The sensor may be a gyroscope. The sensor may be located within a watch, phone, or may be a specialized sensor. For example, a displacement sensor may be placed on suspension. In another example, an inertial measurement unit may be placed on a frame. In a further example, an inertial measurement unit may be placed on a wheel and/or hub.

As illustrated the first sensor 206 has an output waveform 212, the second sensor 208 has an output waveform 214, and the third sensor 210 has an output waveform 216. The first sensor 206, which is the closest to the road surface 202 will detect the impact from the bump first, as illustrated at time T1. The second sensor 208, located further away from the bump 204, senses the impact at time T2. The third sensor 210, located the furthest away from the road surface 202 detects the impact from the bump 204 at time T3.

Based on the distances between the respective sensor and the road surface, it may be expected that there is a reduction in intensity and a time delay as experienced from near the road surface 202 to the upper portion of the rider. For example, the first sensor 206, located near the hub, measures an intensity level that is more than the intensity level measured by the second sensor 208, located near the frame. Further, the second sensor 208 measures an intensity level that is more than the intensity level of the third sensor 210, located near the helmet, in this example.

As illustrated at time T1, the waveform 216 for the first sensor 206 measures a large intensity that may last through time T3. The second sensor 208 measures a slightly smaller intensity at time T2. The third sensor 210 sensor measures the smallest intensity at time T3.

Figure 3:
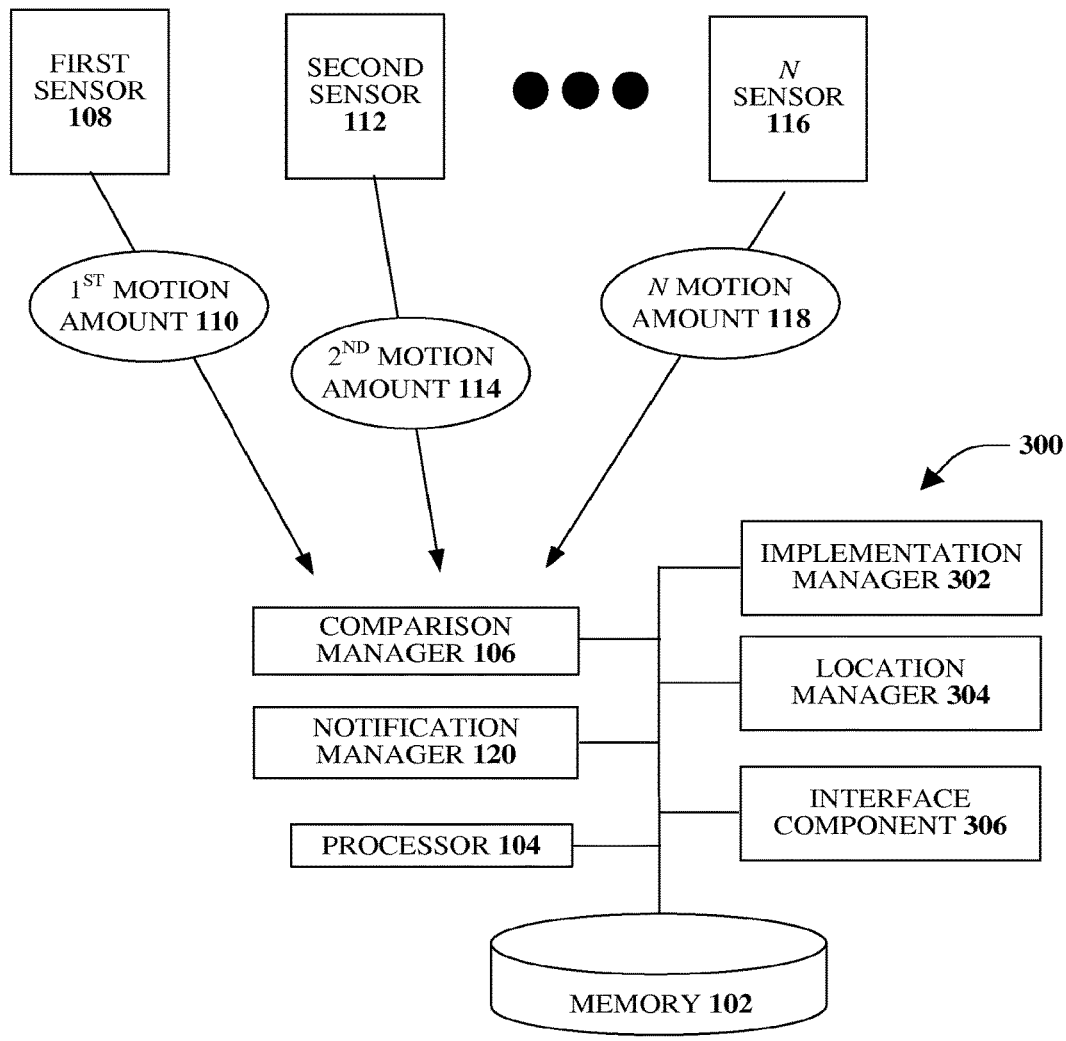
FIG. 3 illustrates an example non-limiting system for capturing historical information related to road hazards according to an aspect of this disclosure.

FIG. 3 illustrates an example non-limiting system 300 for capturing historical information related to road hazards according to an aspect of this disclosure. A comparison manager 106 may record a first motion amount 110 received from a first sensor 108, a second motion amount 114 received from a second sensor 112 and an N motion amount 118 received from an N sensor 116. Each of the sensors 108, 112, 116 may detect a pothole, a bump, an object, or another obstacle on or in a road surface. Each sensor 108, 112, 116 may also measure the severity or impact to the rider (e.g., the motion amount 110, 114, 118 felt by the rider).

The comparison manager 106 may compare the movement of a head/helmet to movement of a frame and/or a wheel of the vehicle, for example. According to an implementation, the comparison manager 106 assigns a score for how smooth a ride/lap is based on an estimated impact to the rider. For example, a smooth ride may have a low score and a bumpy ride may have a high score (or vice versa), or any score there between. Thus, a newly paved road may have a low score, while a road made having a gravel surface may have a higher score.

A calculation may be applied to an individual rider resulting in a representation of a transfer function (TF). The transfer function may be utilized to recommend shock stiffness, tire pressure, and parameters of other vehicle subcomponents. A reduction of intensity and a time delay is expected as moving from the hub, to the frame, and then to the helmet. Thus, the acceleration and/or force measurements may be utilized by the notification manager 120 to make recommendations to the rider. According to some implementations, an implementation manager 302 may be configured to automatically facilitate a change to one or more components of the vehicle.

For example, a specific change may characterize the suspension, including the transfer function of the rider. Changes lower in the chain (e.g., hub, frame) may improve comfort up the chain (e.g., rider, helmet, head). The implementation manager 302 may suggest or implement automatically spring stiffness and/or tire pressure. According to some implementations, the implementation manager 302 may provide intelligent avoidance of obstacles on certain road surfaces. For example, certain speeds and distances of disturbances may be compared to natural frequency of the bike-rider system and an adjustment recommended (e.g., by the notification manager 120) or automatically implemented (e.g., by the implementation manager 302). Further, the implementation manager 302 may utilize applications for dynamically changing vehicle parameters, such as spring stiffness.

According to an implementation, a sensor located near a hub or frame may provide an advanced notice of the forces the rider may feel (e.g., advanced by several milliseconds). Thus, the various aspects may intelligently pass some controls to the vehicle when the rider will experience significant force that may impair riding ability. For example, the implementation manager 302 may stiffen the required steering force so that unintended movements by the rider do not change the steering direction.

According to an implementation, the system 300 may include a location manager 304 that determines a location of the rider (and the vehicle) at about the same time as a trigger event occurs. The trigger event may be the detection of a sudden movement (e.g., the movement at time T1 of FIG. 2). In another example, the trigger event may be a movement that deviates from a current movement by more than a defined amount (e.g., a percentage).

According to some implementations, the trigger event may be based on an input received from a user, which may be received by one or more interface components 306. For example, the user might be driving down the road and see a pothole, but does not drive through the pothole. Therefore, the sensors will not detect the pothole, but the location of the rider at that time may be determined by the location manager 304. According to some implementations, the user may tap their helmet (or another location) to indicate the trigger event. In an implementation, the user may beep their horn or perform another action that indicates to the system 300 to capture the location.

The user might also provide information related to the item that triggered the input (e.g., the pothole in this example). For example, after providing a trigger action, the user may speak a few words (e.g., pothole, tire in road) that links with the trigger event and the location.

Further to this implementation, a picture may be taken of the environment. For example, the system may include a sensor or a camera that is configured to capture the environment. In another example, the rider (e.g., a passenger) may take a picture of the reason for the manual trigger event. For example, a picture may be taken of a foreign object in the road, a deformity in the road, a pothole or other depression in the road, and so on. The picture may be linked with the location and measurements for one or more sensors.

According to some implementations, the interface component 306 (as well as other interface components discussed herein) may provide a graphical user interface (GUI), a command line interface, a speech interface, Natural Language text interface, and the like. For example, a GUI may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or API. In addition, the command line interface may be employed in connection with hardware (e.g., video cards) and/or displays (e.g., black and white, and EGA) with limited graphic support, and/or low bandwidth communication channels.

Figure 4:
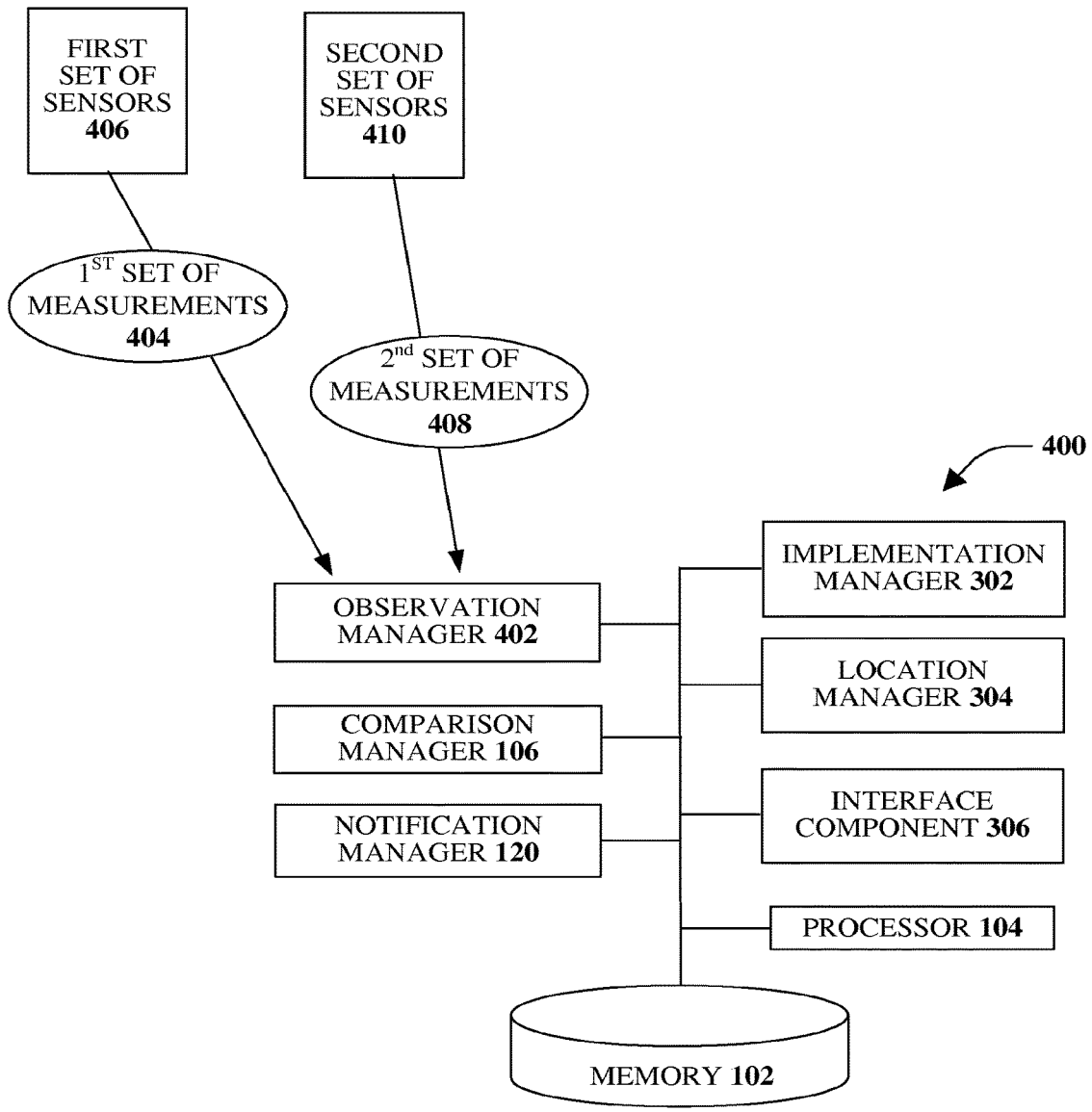
FIG. 4 illustrates an example non-limiting system for providing notification to other users based on sensor information according to an aspect of this disclosure.

FIG. 4 illustrates an example non-limiting system for providing notification to other users based on sensor information according to an aspect of this disclosure. Information received from sensors associated with different vehicles/riders (or the same rider) may be combined and used to notify others of road conditions.

An observation manager 402 may receive measurements taken from different sets of sensors associated with different vehicles. For example, a first set of measurements 404 may be received from a first set of sensors 406, a second set of measurements 408 may be received from a second set of sensors 410. Further, subsequent sets of measurements may be received from subsequent sets of sensors. The information received from each set of sensors may be received at substantially the same time or at different times.

According to some implementations, a single vehicle may provide a first set of measurements at a first time and a second set of measurements at a second time. For example, a road may be traversed each day on the way to work. Therefore, each day measurements may be received by the observation manager 402. Each of these measurements may be compared to each of the other measurements received from the same set of sensors or from the different sets of sensors.

For example, hazards on a road surface may be detected by the first set of sensors 406, the second set of sensors 410, and/or subsequent sets of sensors. The sets of measurements captured by each set of sensors may be conveyed to a comparison manager 106 that determines a severity measurement to the respective riders. For example, movement of a head/helmet may be compared to movement of a frame and/or wheel.

A notification manager 120 may utilize acceleration/force measurement to make recommendations to the rider or to other riders that are expected to traverse that portion of the road surface. Such recommendations may include avoiding the road, using caution, changing speed, changing lanes, and so on. The recommendation may be provided on an individual basis or may be provided to all users within the general area and available as needed. In such a manner, riders that have not traveled the road area previously may benefit from the information previously gathered from other riders.

Figure 5:
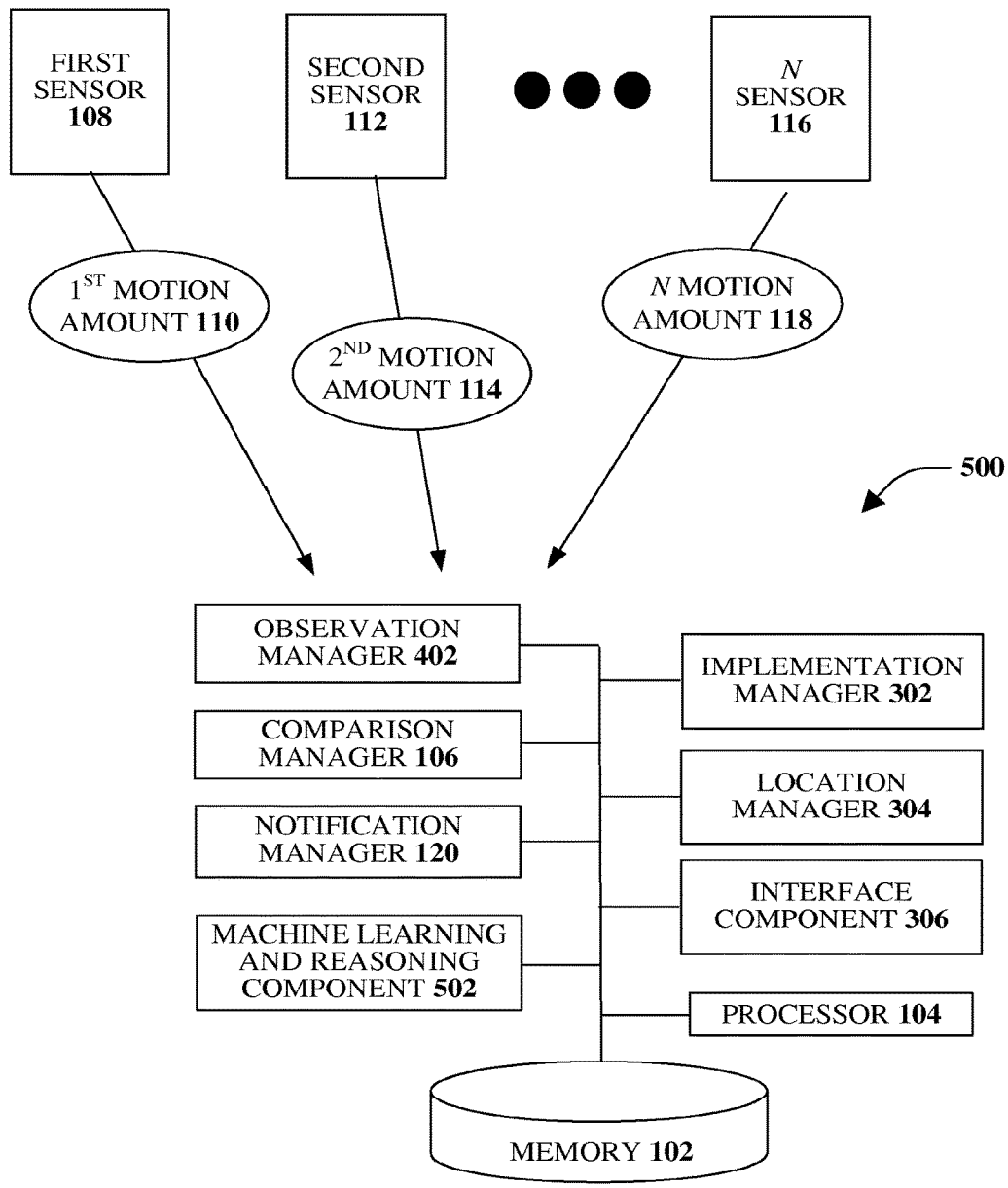
FIG. 5 illustrates an example non-limiting system that utilizes automated learning according to an aspect of this disclosure.

FIG. 5 illustrates an example non-limiting system 500 that utilizes automated learning according to an aspect of this disclosure. Automated learning may be employed to facilitate one or more of the disclosed aspects. For example, a machine learning and reasoning component 502 may be utilized to automate one or more of the disclosed aspects. The machine learning and reasoning component 502 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component 502 may infer when a severity level should be determined, when a location should be captured, and so on by obtaining knowledge about the locations of various sensors, knowledge about what information should be captured, the use of that captured information based on driving behavior of the user, the traffic condition, the weather conditions, or combinations thereof. Based on this knowledge, the machine learning and reasoning component 502 may make an inference based on which vehicle subcomponent should be modified, whether to change a speed, whether to recommend an alternative route, and which other actions to implement and/or suggest, or combinations thereof.

As used herein, the term "inference" refers generally to the process of reasoning about or inferring states of the system, a component, a module, the environment, and/or a vehicle from a set of observations as captured through events, reports, data and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component 502 has uncertainty related to the intent or the request, the machine learning and reasoning component 502 may automatically engage in a short (or long) dialogue or interaction with the user (e.g., "Did you want me to capture that location (or event)?"). In accordance with some aspects, the machine learning and reasoning component 502 engages in the dialogue with the user through another system component. Computations of the value of information may be employed to drive the asking of questions. Alternatively or additionally, a cognitive agent component (not shown) and/or the machine learning and reasoning component 502 may anticipate a user action (e.g., "what did he mean?") and continually, periodically, or based on another interval, update a hypothesis as more user actions are gathered. The cognitive agent component may accumulate data or perform other actions that are a result of anticipation of the user's future actions.

The various aspects (e.g., in connection with making recommendations to a rider, determining the meaning of the one or more user inputs, distinguishing a user input from other actions, implementation of recommendations to overcome an impact to the rider, and so forth) may employ various artificial intelligence-based schemes for carrying out various aspects thereof. For example, a process for determining if a particular action is a request to capture a road condition or a general action (e.g., an action that the user is making to steer the vehicle) may be enabled through an automatic classifier system and process.

A classifier is a function that maps an input attribute vector, x=(x1, x2, x3, x4, xn), to a confidence that the input belongs to a class. In other words, f(x)=confidence(class). Such classification may employ a probabilistic and/or statistical-based analysis (e.g., factoring into the analysis utilities and costs) to prognose or infer an action that should be employed to determine what a user desires to be automatically captured. In the case of selections, for example, attributes may be identification of a trigger event and the classes are criteria of the environment that need to be observed to recommend an action based on the trigger event.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing user behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to implement an action, which action to implement, when to suggest an action, comparing events recorded by various riders, and so forth. The criteria may include, but is not limited to, similar event notifications, historical information, and so forth.

Additionally or alternatively, an implementation scheme (e.g., a rule, a policy, and so on) may be applied to control and/or regulate the gathering of data and resulting actions, inclusion of a group of users to receive input related to an environment, and so forth. In some implementations, based upon a predefined criterion, the rules-based implementation may automatically and/or dynamically interpret received data. In response thereto, the rule-based implementation may automatically interpret and carry out functions associated with the received data by employing a predefined and/or programmed rule(s) based upon any desired criteria.

Methods that may be implemented in accordance with the disclosed subject matter will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
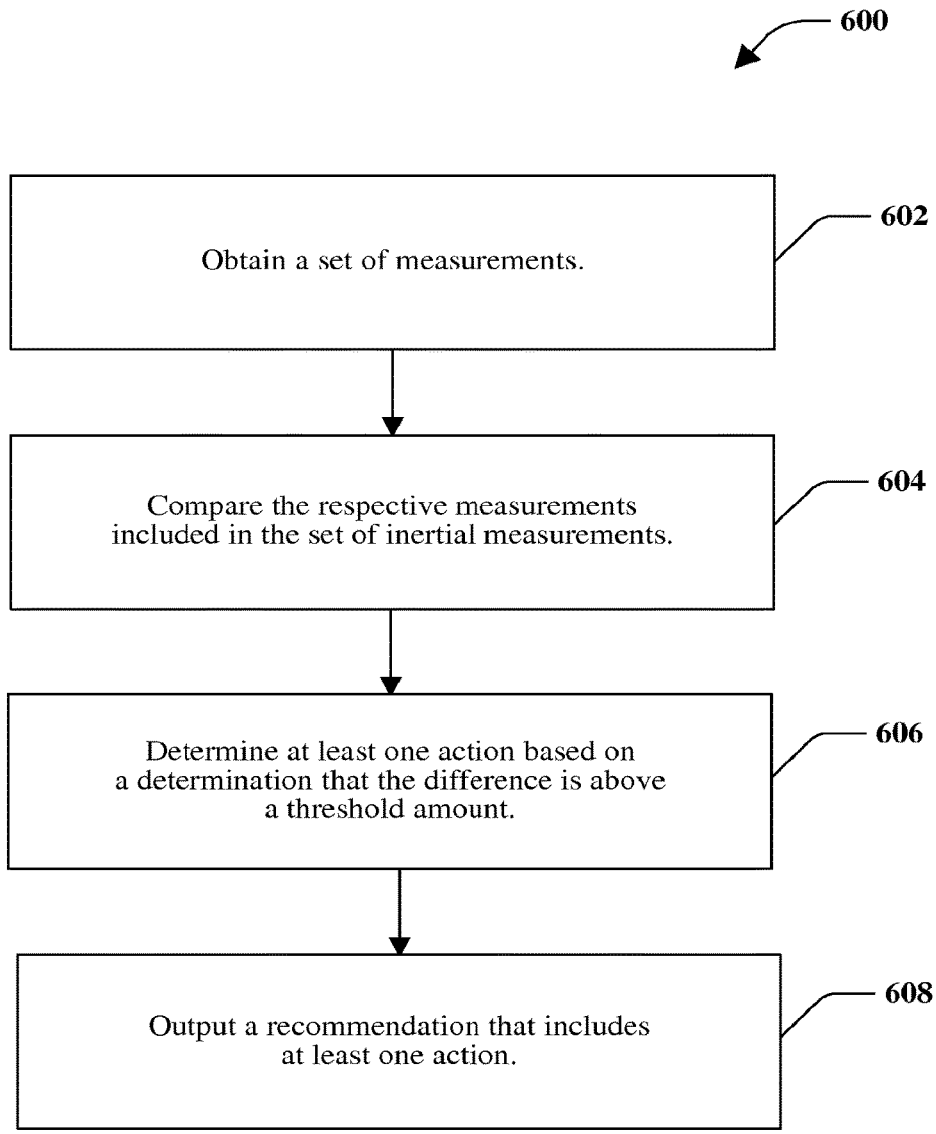
FIG. 6 illustrates an example non-limiting method for making recommendations to a driver according to an aspect of this disclosure.

FIG. 6 illustrates an example non-limiting method 600 for making recommendations to a driver according to an aspect of this disclosure. The method 600 may be implemented using any of the systems, such as the system 100 of FIG. 1, described herein.

The method 600 starts at 602 when a set of measurements are received. The set of measurements may include velocity, orientation, gravitational forces, and so on. Additionally, respective measurements of the set of measurements are determined at different levels of a vehicle suspension. The set of measurements may be received from one or more sensors located at various positions (or locations) on a vehicle, an operator of the vehicle, and/or a passenger of the vehicle. One or more of the sensors may be an inertial measurement unit. Further, different sensors may provide respective measurements of the set of measurements.

At 604, the respective measurements are compared to each other to determine one or more differences between the measurements. Further, the comparison may include a comparison of a time stamp associated with each measurement. For example, a measurement taken close to the ground may indicate a higher intensity at a first time, while a measurement taken farther away from the ground may indicate a lower intensity at a second time, which is after the first time.

At least one action is determined, at 606, based on a determination that the difference is above a threshold amount. For example, the threshold amount may be a percentage of a delta change between a motion detected at time T1 and time T2.

At 608, a recommendation of at least one action is output. The recommendation may be for the user to perform the action (e.g., slow down, change lines, avoid a road). According to some implementations, the recommended action may be automatically performed (e.g., slow down, increase shock stiffness, and so on).

Figure 7:
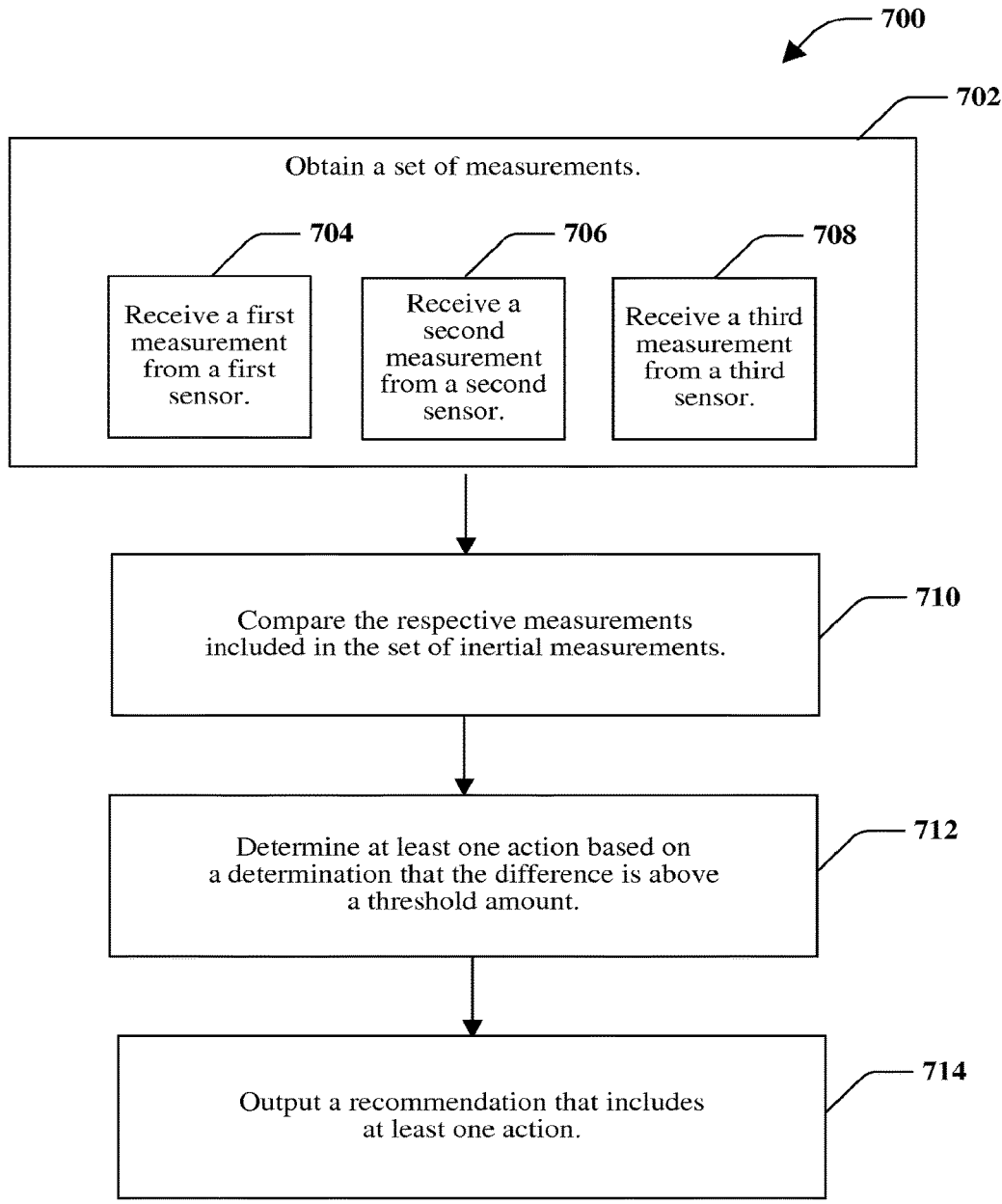
FIG. 7 illustrates an example non-limiting method for receiving sensor information and implementing one or more actions based on the sensor information according to an aspect of this disclosure.

FIG. 7 illustrates an example non-limiting method 700 for receiving sensor information and implementing one or more actions based on the sensor information according to an aspect of this disclosure. The method 700 may be implemented using any of the systems, such as the system 300 of FIG. 3, described herein.

At 702 a set of measurements are received. Each measurement of the set of measurements may be taken at different levels in the suspension of a vehicle. For example, at 704, a first measurement is received from a first sensor. The first sensor may be located on a first portion of a vehicle and below a suspension level of the vehicle (e.g., on or near at least one wheel of the vehicle). At 706, a second measurement is received from a second sensor. The second sensor may be located on a second portion of the vehicle and above a suspension level of the vehicle (e.g., on a vehicle body). Further, at 708, a third measurement is received from a third sensor, which may be located on a rider of the vehicle. According to some implementations, one or more of the first sensor, second sensor, and third sensor are inertial measurement units.

At 710, the first measurement, second measurement, and third measurement are compared. It may be expected that the first measurement has a larger intensity than the second measurement and the intensity of the first measurement occurs before the intensity of the second measurement. In a similar manner, it may be expected that the second measurement has a larger intensity than the third measurement and the intensity of the second measurement occurs before the intensity of the third measurement.

Based on the differences, at least one action is determined, at 712, and a recommendation that includes the at least one action is output, at 714. In an example, the first measurement, second measurement, and third measurement are received from different rider/vehicle pairs (or the same rider/vehicle) over a period of time. Thus, the recommended action may be output to another rider in order for that rider to avoid a hazard or other situation that has already been identified.

Figure 8:
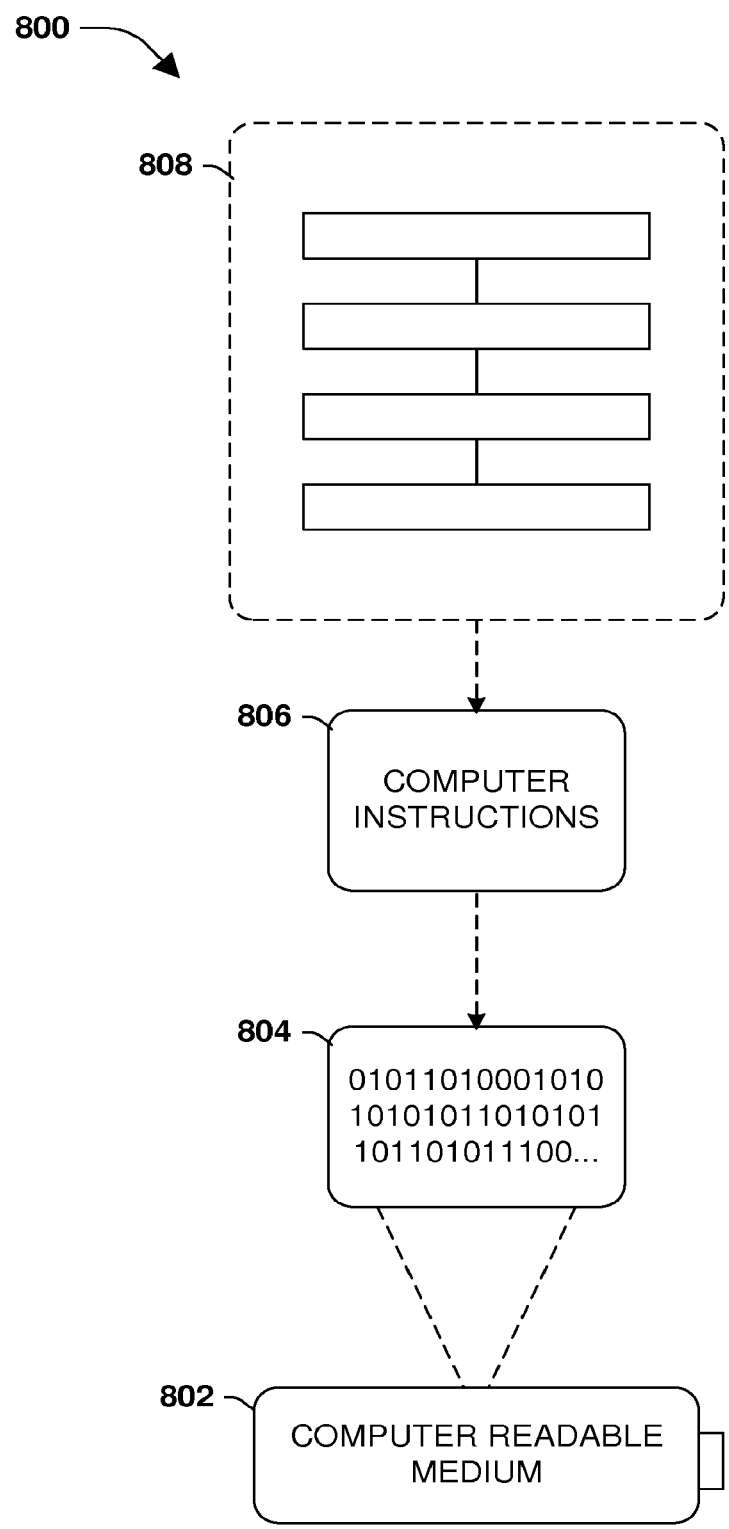
FIG. 8 illustrates an example, non-limiting, computer-readable medium or computer-readable device including processor-executable instructions configured to embody one or more of the aspects of this disclosure.

One or more implementations may include a computer-readable medium including processor-executable instructions configured to implement one or more embodiments presented herein. An embodiment of a computer-readable medium or a computer-readable device devised in these ways is illustrated in FIG. 8, wherein an implementation 800 includes a computer-readable medium 802, such as a CD-R, DVD-R, flash drive, a platter of a hard disk drive, and so forth, on which is encoded computer-readable data 804. The computer-readable data 804, such as binary data including a plurality of zero's and one's as illustrated, in turn includes a set of computer instructions 806 configured to operate according to one or more of the principles set forth herein.

In the illustrated embodiment 800, the processor-executable computer instructions 806 may be configured to perform a method 808, such as the method 600 of FIG. 6 and/or the method 700 of FIG. 7, for example. In another embodiment, the processor-executable instructions 804 may be configured to implement a system, such as the system 100 of FIG. 1 and/or the system 400 of FIG. 4, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
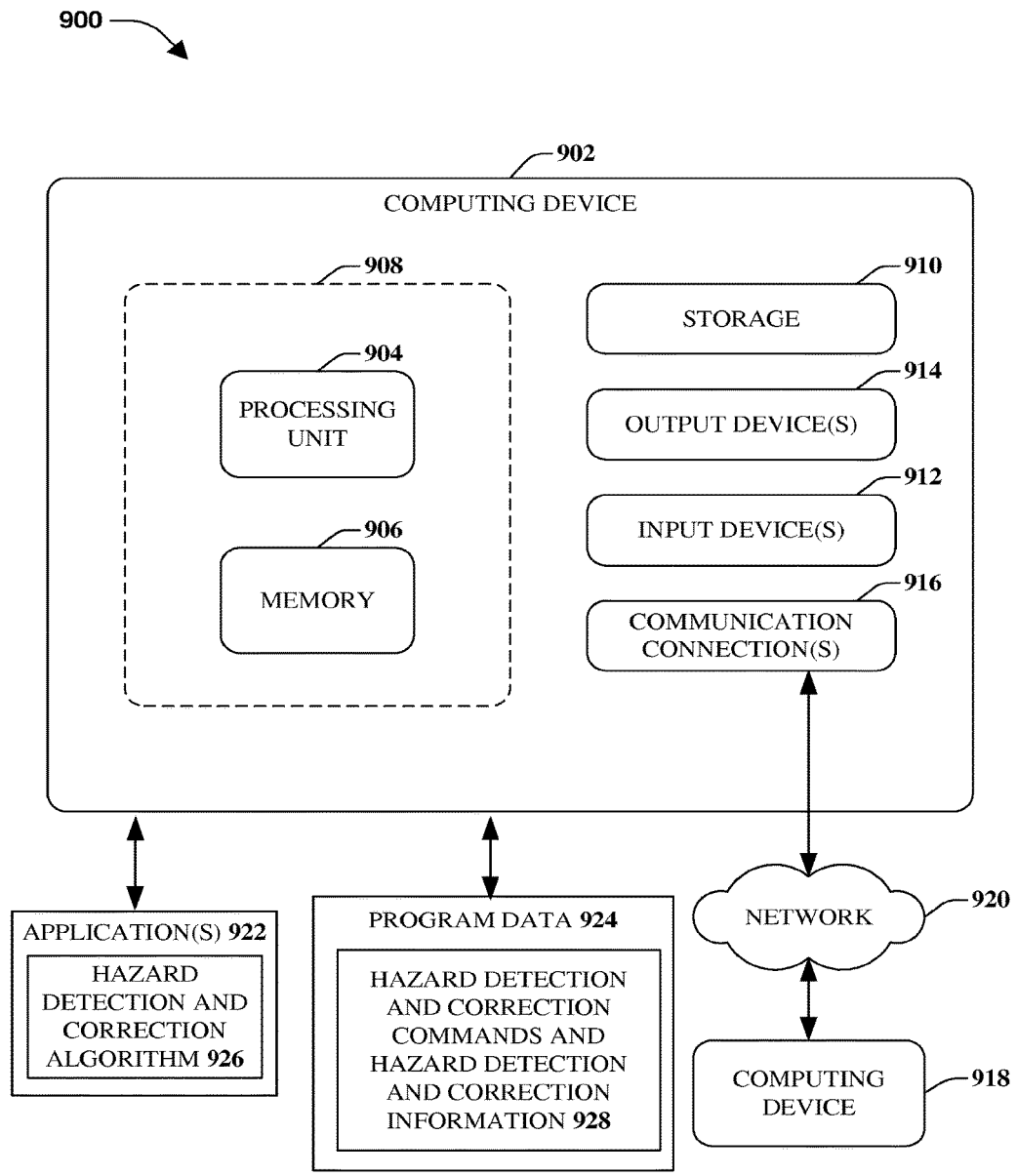
FIG. 9 illustrates an example, non-limiting computing environment where one or more of the aspects of this disclosure are implemented.

FIG. 9 and the following discussion provide a description of a suitable computing environment to implement embodiments of one or more of the aspects set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 9 illustrates a system 900 that may include a computing device 902 configured to implement one or more embodiments provided herein. In one configuration, the computing device 902 may include at least one processing unit 904 and at least one memory 906. Depending on the exact configuration and type of computing device, the at least one memory 906 may be volatile, such as RAM, non-volatile, such as ROM, flash memory, etc., or a combination thereof. This configuration is illustrated in FIG. 9 by dashed line 908.

In other embodiments, the device 902 may include additional features or functionality. For example, the device 902 may include additional storage such as removable storage or non-removable storage, including, but not limited to, magnetic storage, optical storage, etc. Such additional storage is illustrated in FIG. 9 by storage 910. In one or more embodiments, computer readable instructions to implement one or more embodiments provided herein are in the storage 910. The storage 910 may store other computer readable instructions to implement an operating system, an application program, etc. Computer readable instructions may be loaded in the at least one memory 906 for execution by the at least one processing unit 904, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 902 may include input device(s) 912 such as keyboard, mouse, pen, voice input device, touch input device, infrared cameras, video input devices, or any other input device. Output device(s) 914 such as one or more displays, speakers, printers, or any other output device may be included with the device 902. The input device(s) 912 and the output device(s) 914 may be connected to the device 902 via a wired connection, wireless connection, or any combination thereof. In one or more embodiments, an input device or an output device from another computing device may be used as the input device(s) 912 and/or the output device(s) 914 for the device 902. Further, the device 902 may include communication connection(s) 916 to facilitate communications with one or more other devices, illustrated as a computing device 918 coupled over a network 920.

One or more applications 922 and/or program data 924 may be accessible by the computing device 902. According to some implementations, the application(s) 922 and/or program data 924 are included, at least in part, in the computing device 902. The application(s) 922 may include a hazard detection and correction algorithm 926 that is arranged to perform the functions as described herein including those described with respect to the example non-limiting system 400 of FIG. 4. The program data 924 may include hazard detection and correction commands and hazard detection and correction information 928 that may be useful for operation with mitigating the effects of road conditions as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system that identifies road conditions associated with a road surface, comprising:
    a first sensor recording a first motion amount of a head of a rider;
    a second sensor recording a second motion amount of a first portion of a vehicle;
    a comparison manager determining a severity level of a trigger event on the rider operating the vehicle and the vehicle based on a comparison between the first motion amount and the second motion amount, and
    a notification manager providing at least one recommendation to the rider based on the severity level, and when the determined severity level exceeds a predetermined threshold automatically adjusting a vehicle parameter that affects a transfer function between the vehicle and the rider;
    wherein the vehicle parameter is at least one of shock stiffness, spring stiffness, tire pressure, chain height, steering force, or a vehicle subcomponent.

2. The system of claim 1, further comprising a third sensor recording a third motion amount of a second portion of the vehicle different than the first portion of the vehicle.

3. The system of claim 2, wherein the second sensor is operatively attached to the vehicle above a vehicle suspension and the third sensor is operatively attached to the vehicle below the vehicle suspension.

4. The system of claim 2, wherein the second sensor is operatively attached to a body of the vehicle and the third sensor is operatively attached to a wheel of the vehicle.

5. The system of claim 1, wherein the first sensor is operatively attached to a helmet of the rider.

6. The system of claim 1, wherein the comparison manager assigns a smoothness score to a portion of the road surface, wherein the smoothness score is determined based at least in part on the severity level.

7. The system of claim 1, wherein the comparison manager compares the first motion amount and the second motion amount to a natural frequency of the rider and the vehicle.

8. The system of claim 1, further comprising a locator determining a location of the rider at about the same time as the trigger event occurs.

9. The system of claim 8, wherein the trigger event is determined based on a determination that a difference between the first motion amount and the second motion amount is above a threshold level.

10. The system of claim 8, wherein the trigger event is determined based on an input received from the rider.

11. The system of claim 1, wherein the first sensor comprises a G sensor capable of determining acceleration.

12. A method for identifying road conditions associated with a road surface, comprising:
obtaining, by a system comprising a processor, a set of measurements, wherein respective measurements of the set of measurements are determined at different levels of a vehicle suspension;
comparing, by the system, respective measurements of the set of measurements to determine a severity level of a trigger event on the vehicle;
determining, by the system, at least one action based on the determined severity level when a difference between at least two measurements of the respective measurements is above a threshold amount; and
outputting, by the system, a recommendation that includes an implementation of the at least one action, wherein the at least one action includes automatically adjusting a vehicle parameter that effects a transfer function between the vehicle and a rider of the vehicle;
wherein the vehicle parameter is at least one of shock stiffness, spring stiffness, tire pressure, chain height, steering force, or a vehicle subcomponent.

13. The method of claim 12, wherein the obtaining the set of measurements comprises:
receiving, by the system from a first sensor located a first portion of the vehicle body, a first measurement of the set of measurements;
receiving, by the system from a second sensor located on a second portion of the vehicle body, a second measurement of the set of measurements; and
receiving, by the system from a third sensor located on the rider of the vehicle, a third measurement of the set of measurements, wherein the first sensor, the second sensor, and the third sensor are inertial measurement units.

14. The method of claim 13, wherein the first portion of the vehicle body is below a suspension level and the second portion of the vehicle body is located above the suspension level.

15. The method of claim 12, further comprising determining, by the system, a location of the vehicle at about the same time as the trigger event occurs.

16. The method of claim 12, wherein the comparing comprises:
determining a difference between a first measurement taken below a suspension level of the vehicle and a second measurement taken above the suspension level; and
triggering an action based on the second measurement being more than the first measurement.

17. A system for implementing an action based on road conditions associated with a road surface, comprising;
a first sensor recording a first motion amount at a first portion of a vehicle located below a suspension level;
a second sensor recording a second motion amount at a second portion of a vehicle located above a suspension level;
a third sensor recording a third motion amount at a helmet of a rider on the vehicle;
a comparison manager determining a severity level of a trigger event on the rider on the vehicle and the vehicle based on a comparison between the first motion amount, the second motion amount, and the third motion amount; and
a notification manager providing at least one recommendation to the rider based on a determination that the severity level is above a threshold amount, and when the determined severity level is above another threshold automatically adjusting a vehicle parameter that affects a transfer function between the vehicle and the rider;
wherein the vehicle parameter is at least one of shock stiffness, spring stiffness, tire pressure, chain height, steering force, or a vehicle subcomponent.

18. The system of claim 17, wherein at least one of the first sensor, the second sensor, and the third sensor comprises a G sensor capable of determining acceleration.

* * * * *